June 12, 1934.  F. M. YOST  1,962,166
APPARATUS FOR REFORMING CAN BODIES
Filed Feb. 20, 1931  12 Sheets-Sheet 1

INVENTOR
Frank Marshall Yost
BY
John C. Carpenter
ATTORNEY

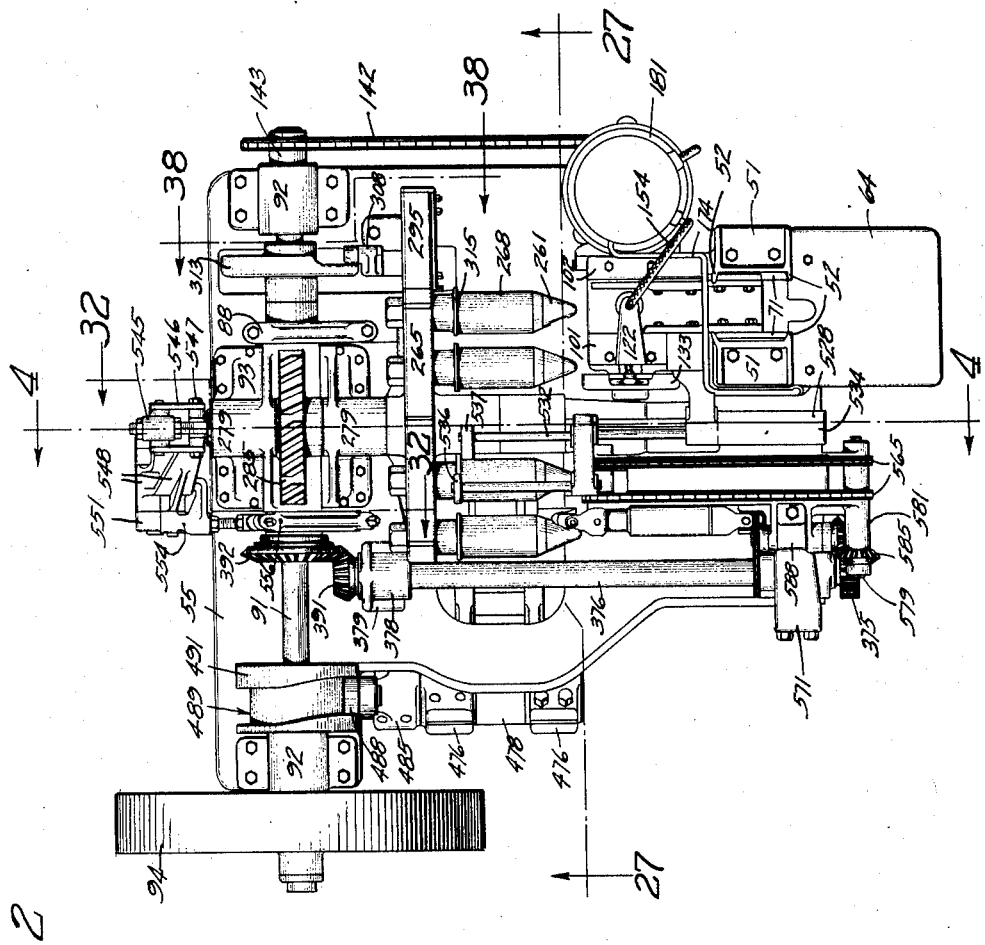

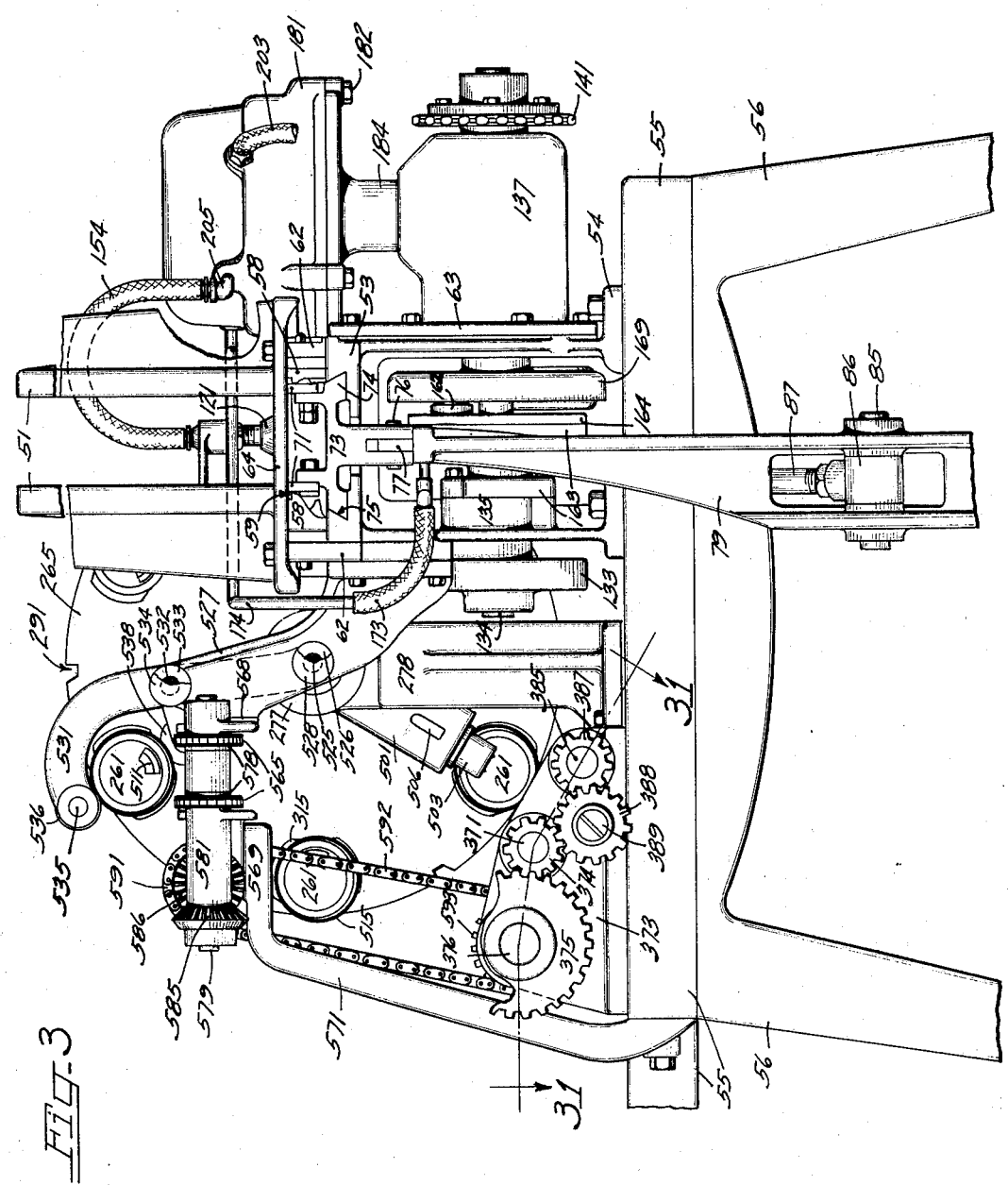

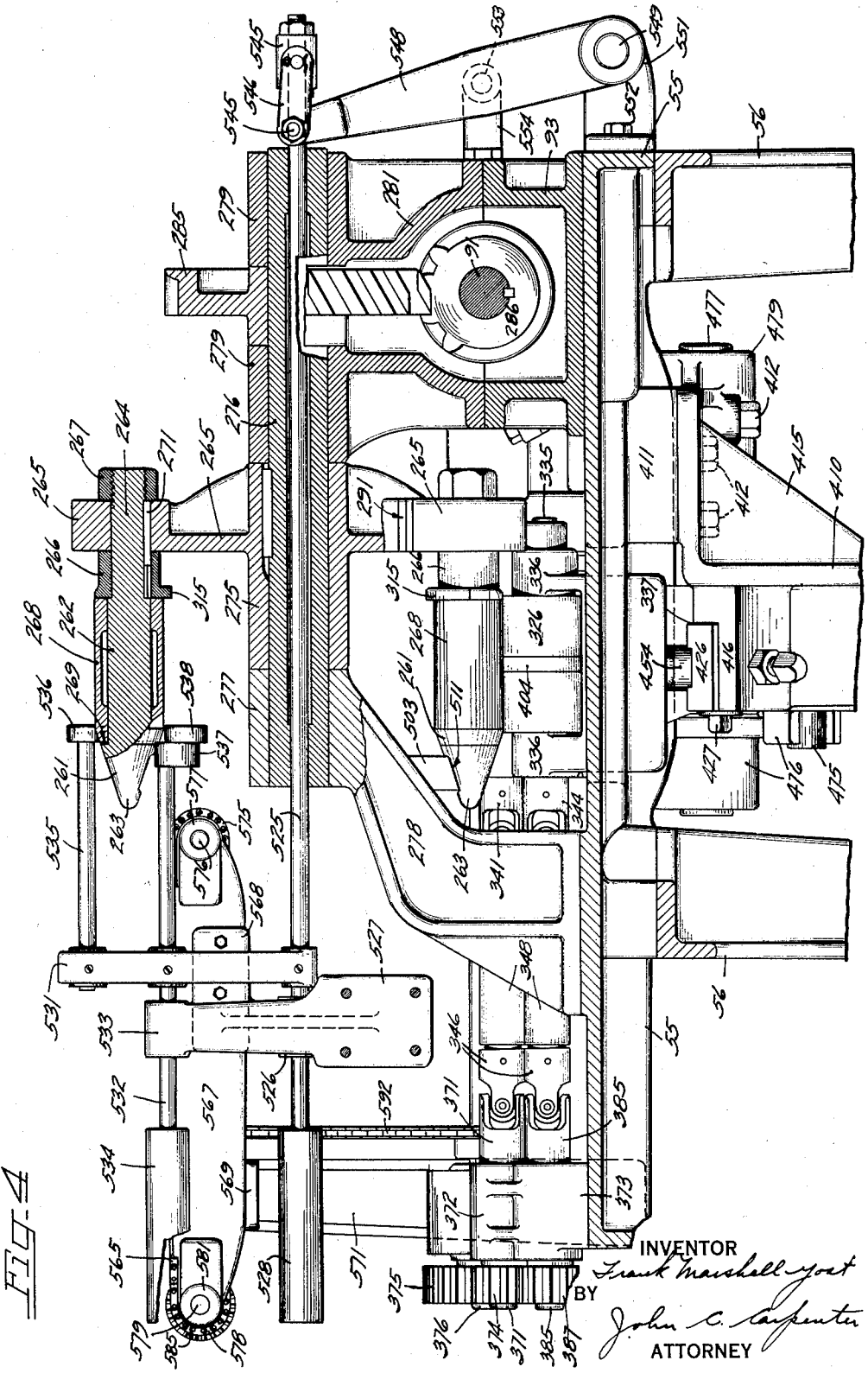

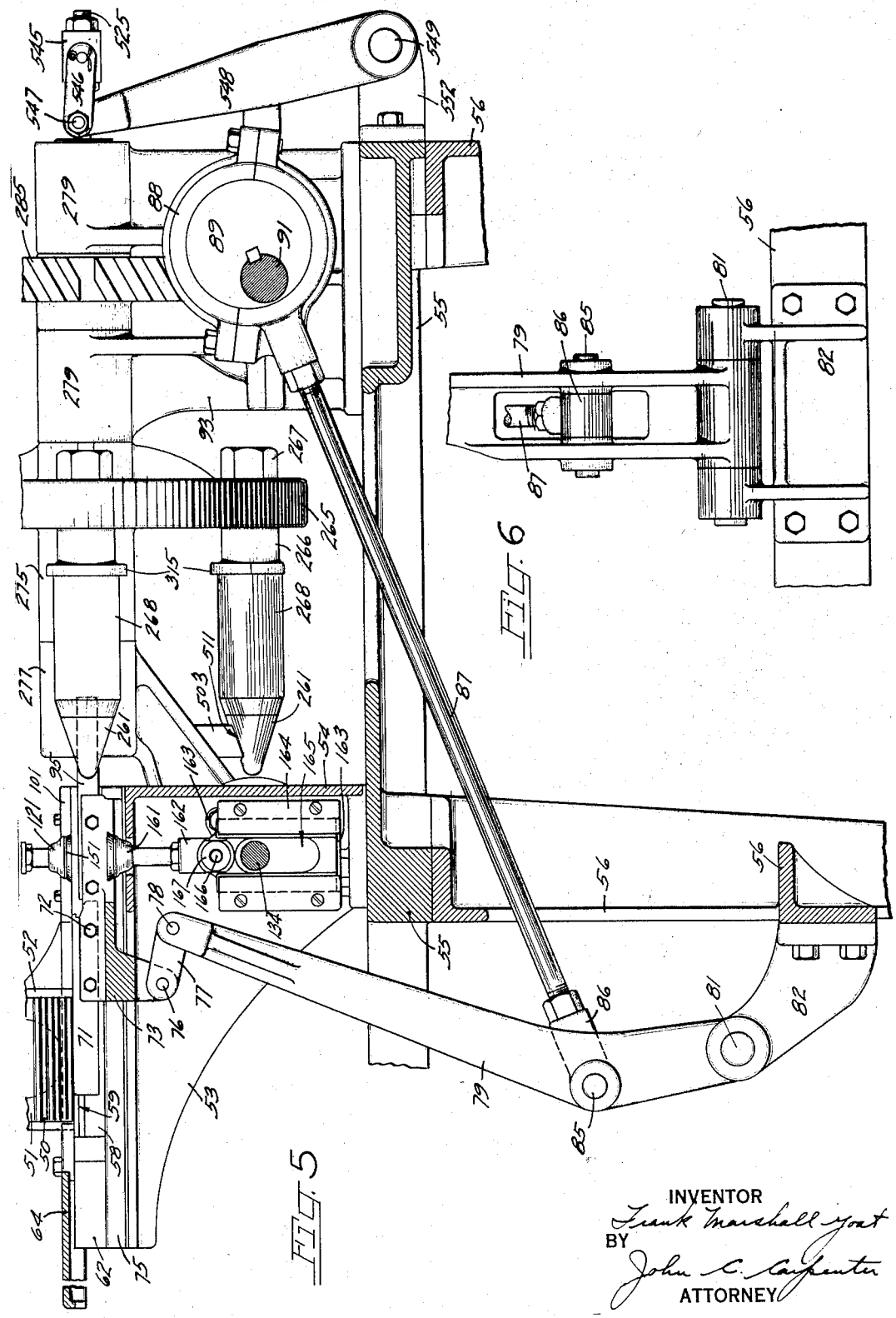

June 12, 1934.  F. M. YOST  1,962,166
APPARATUS FOR REFORMING CAN BODIES
Filed Feb. 20, 1931  12 Sheets-Sheet 6

INVENTOR
Frank Marshall Yost
BY
John C. Carpenter
ATTORNEY

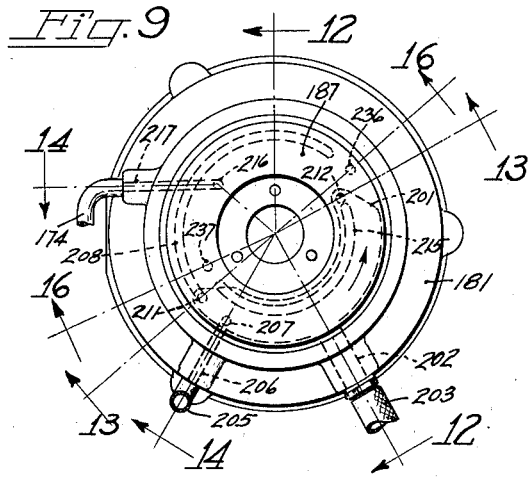
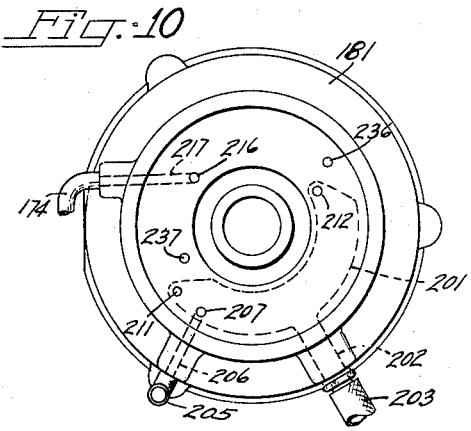
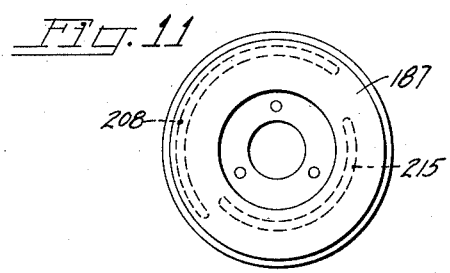
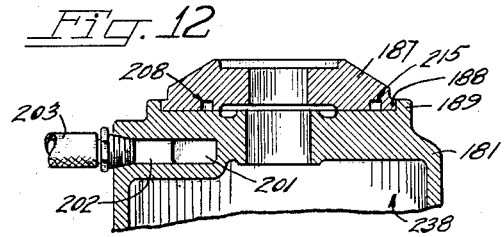
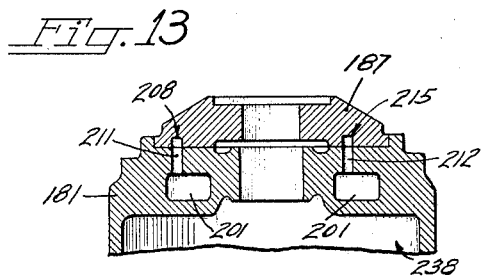
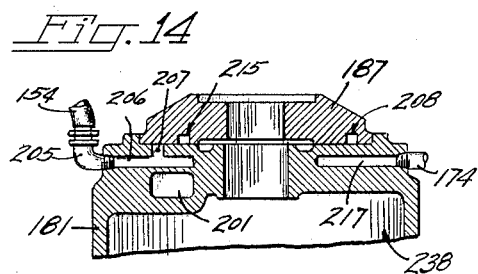
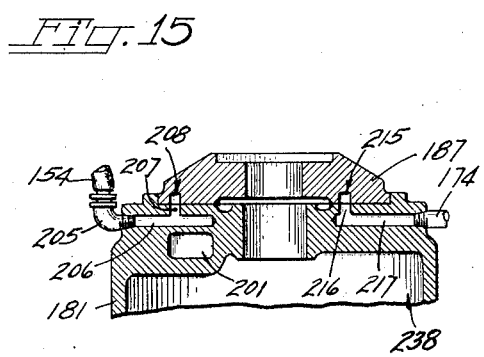
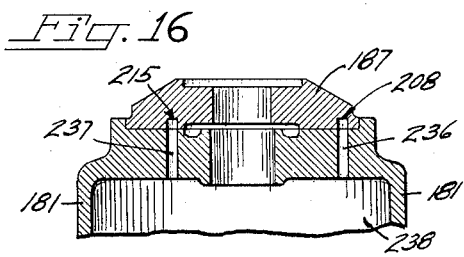

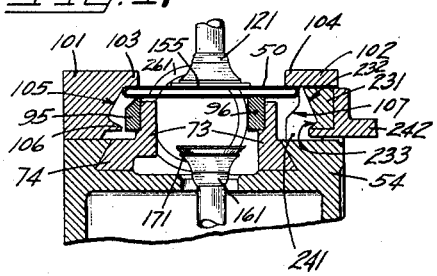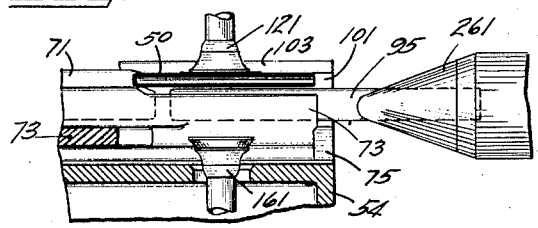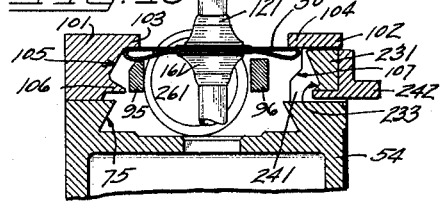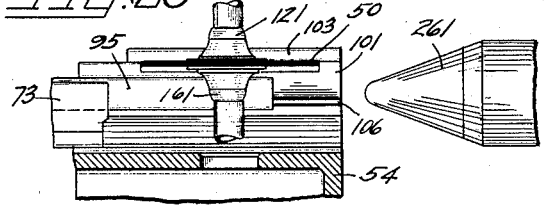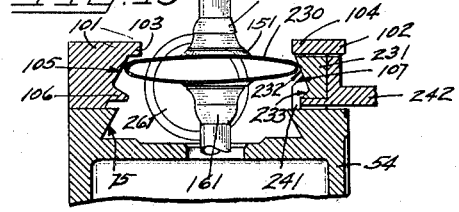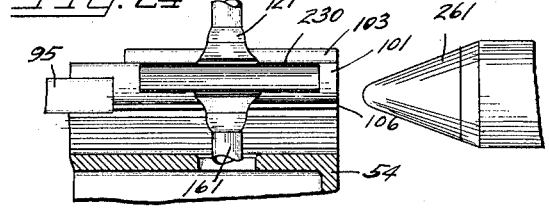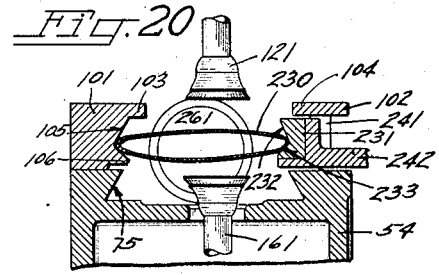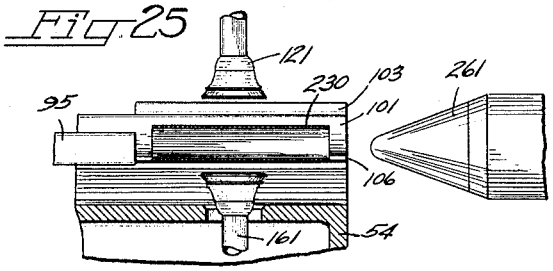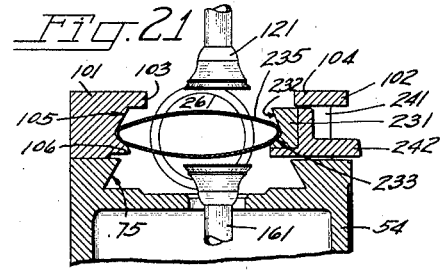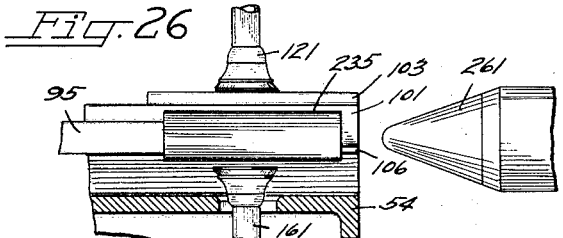

June 12, 1934.     F. M. YOST     1,962,166
APPARATUS FOR REFORMING CAN BODIES
Filed Feb. 20, 1931     12 Sheets-Sheet 9
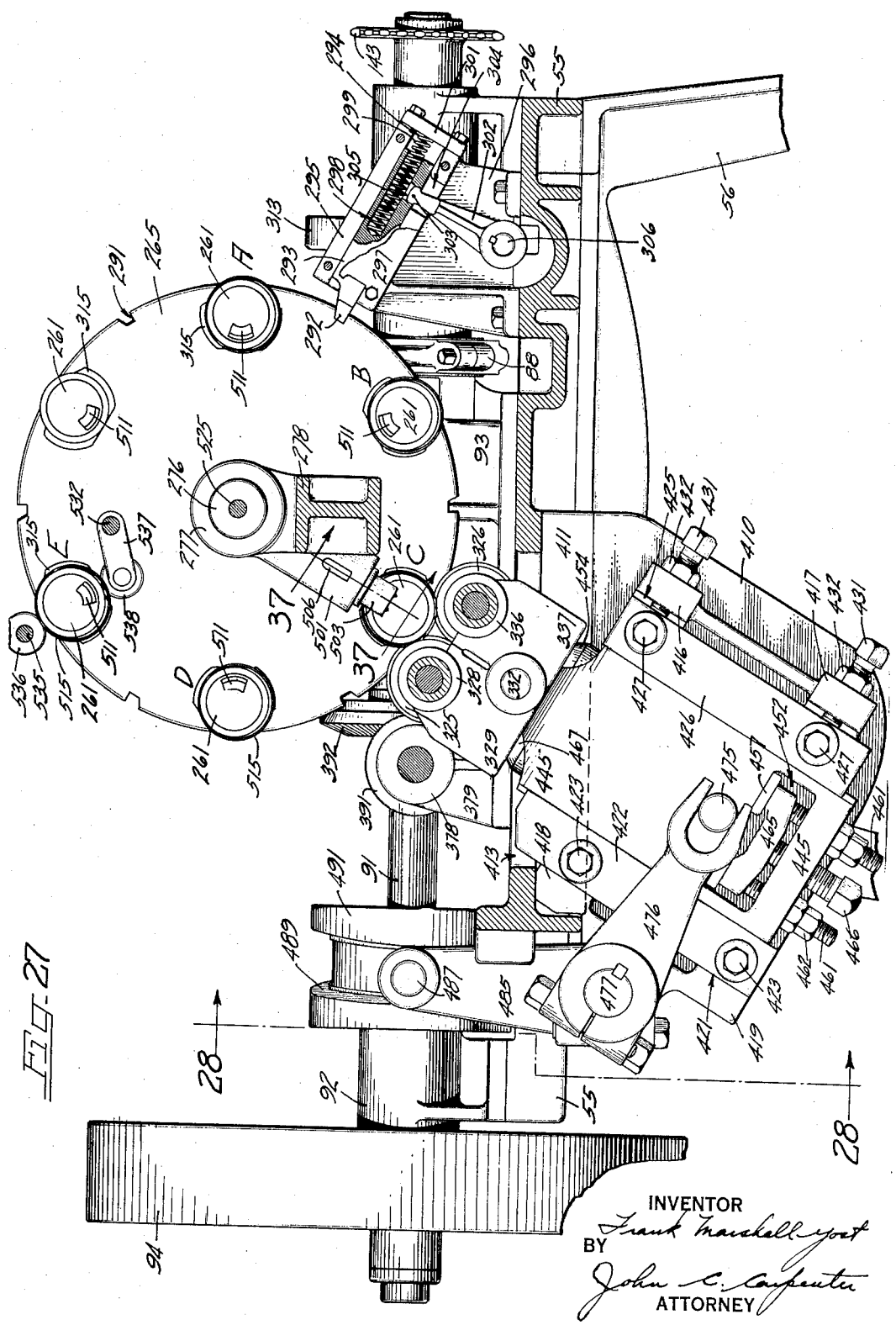
INVENTOR
Frank Marshall Yost
BY
John C. Carpenter
ATTORNEY

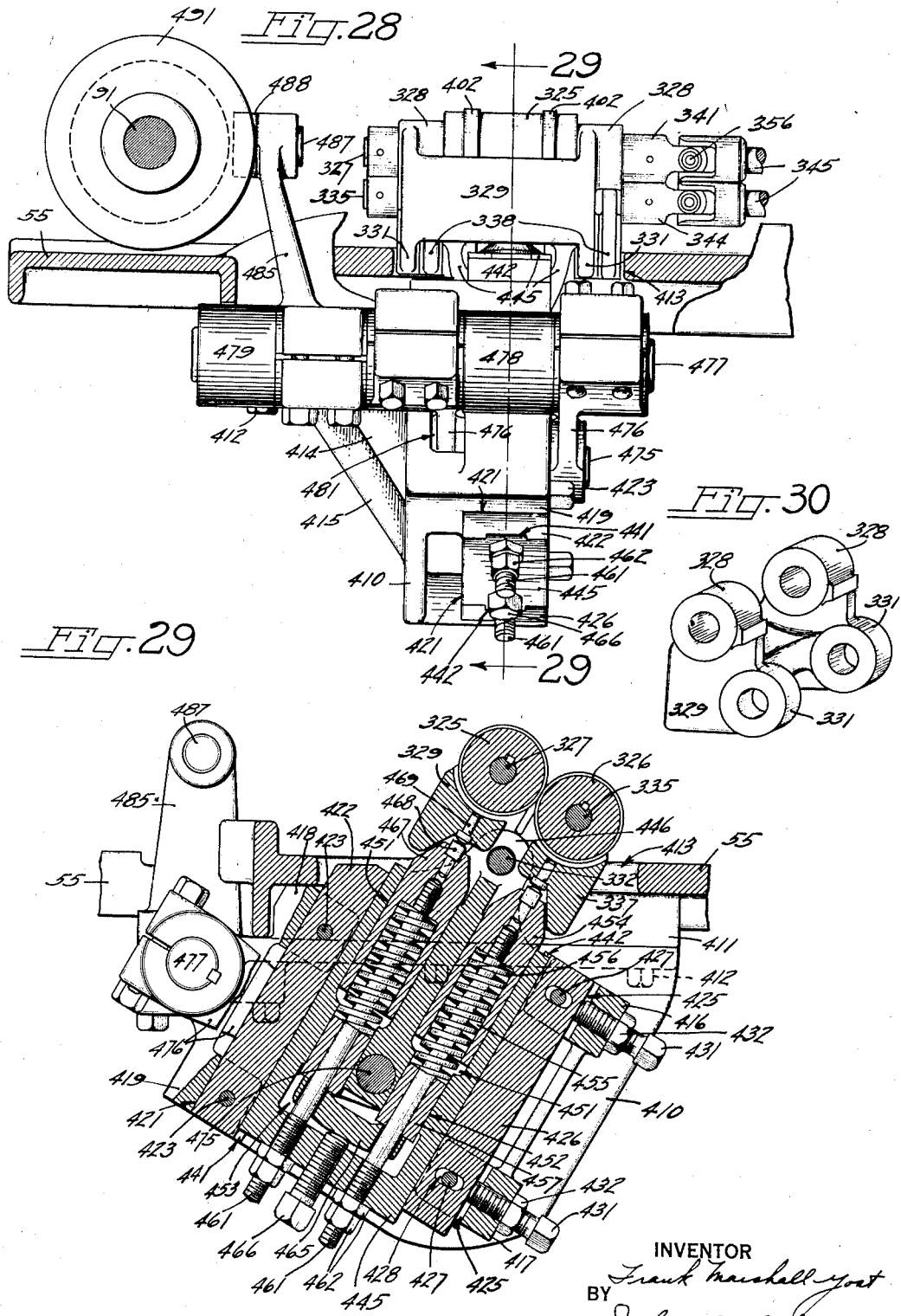

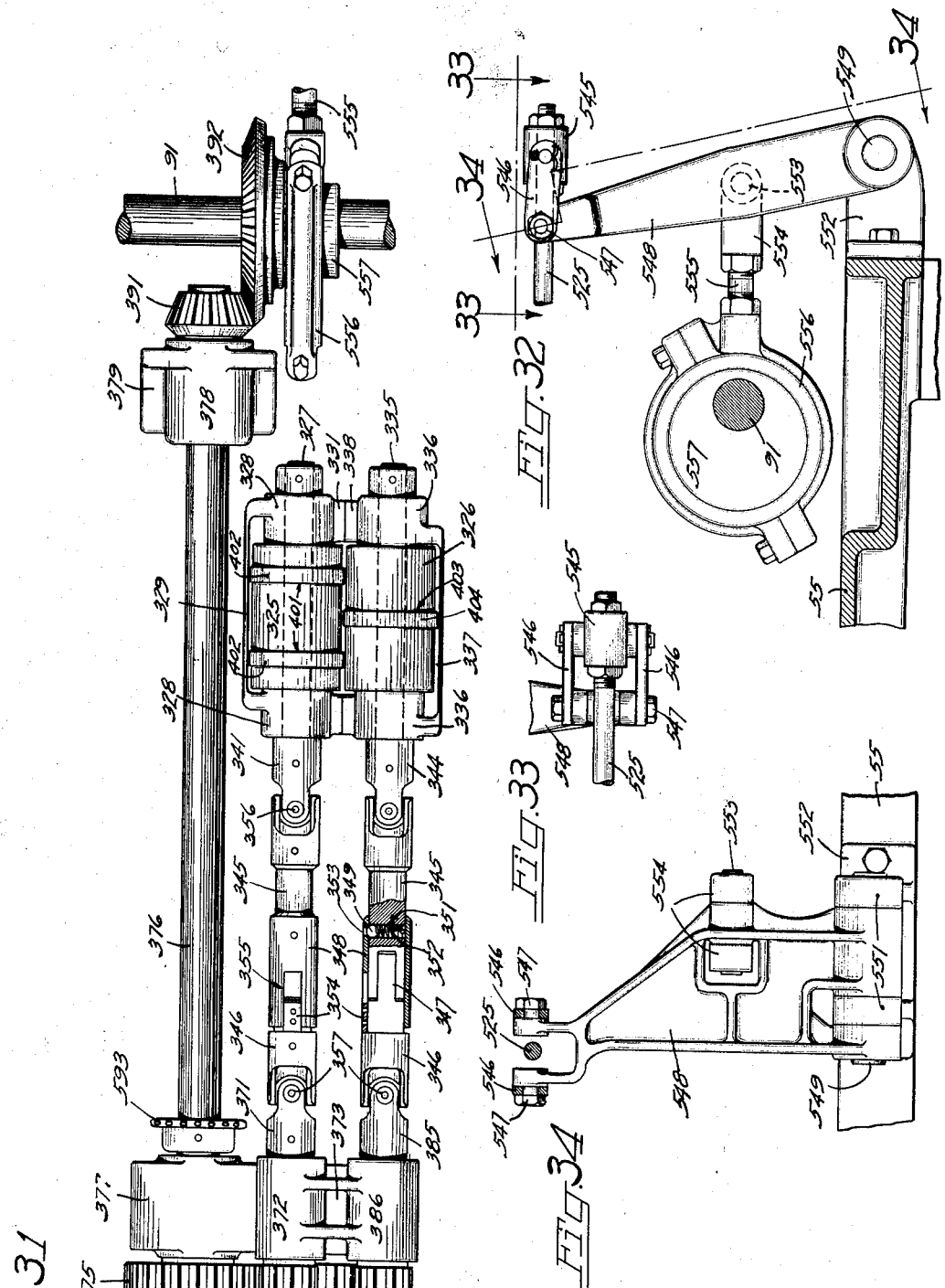

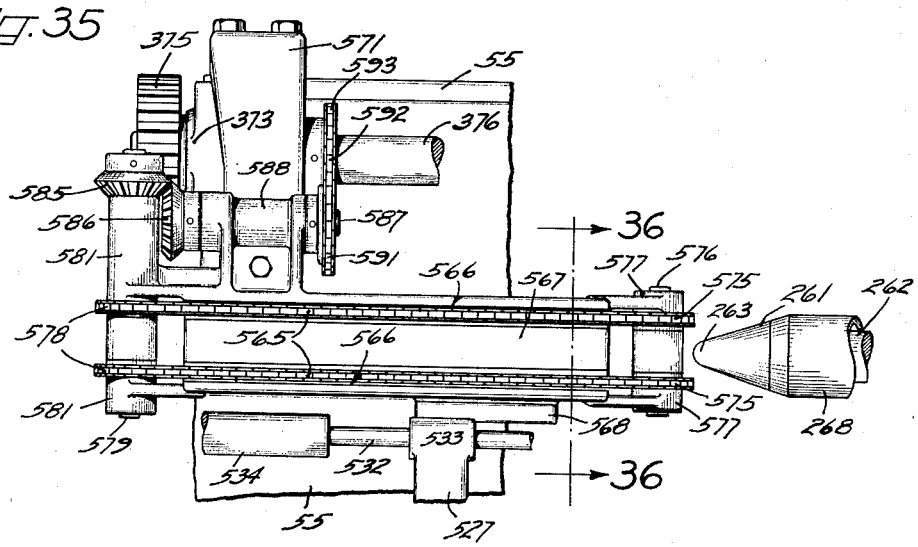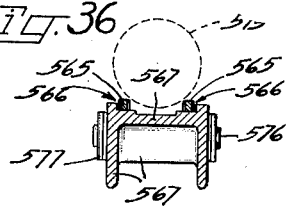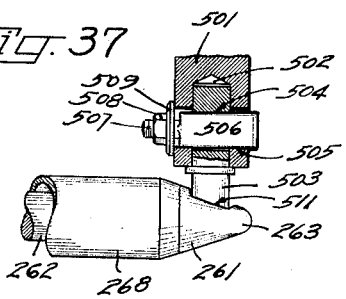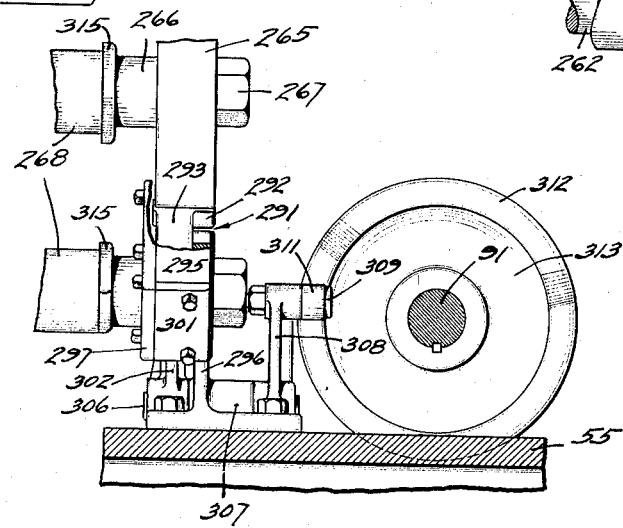

Patented June 12, 1934

1,962,166

UNITED STATES PATENT OFFICE 1,962,166

APPARATUS FOR REFORMING CAN BODIES

Frank Marshall Yost, Portland, Oreg., assignor to American Can Company, New York, N. Y., a corporation of New Jersey Application February 20, 1931, Serial No. 517,159

26 Claims. (Cl. 153—32)

The present invention relates to an apparatus for reforming can bodies by restoring them to their original shape after they have been flattened as for shipment and storage, and has particular reference to improved features for partially opening the flattened body and for finally reforming the same.

The principal object of the present invention is the provision of an apparatus for rapidly reforming flattened can bodies in a series of simple and effective operations whereby the body is first partially opened from its flattened shape, after which, its walls are ironed out or smoothed and the body is restored to its normal can body shape.

An important object of the invention is the provision of an apparatus for automatically feeding flattened can bodies from a magazine to a spreading station where the flattened body is partially opened in a series of spreading and squeezing steps prior to its final reformation.

An important object of the invention is the provision of self-adjusting, self-centering, ironing rollers for restoring a flattened can body to its normal shape. A further important object of the invention is the provision of suction heads for engaging the exterior walls of a flattened can body and initially spreading and partially opening the same for insertion within a reforming station, with an automatic control of the suction within the suction heads operating in synchronism with the spreading operation.

Numerous other objects of the invention will be apparent as it is better understood from the following description, which, taken in connection with the accompanying drawings, discloses a preferred embodiment thereof.

Referring to the drawings:

Fig. 2 is a top plan view;

Fig. 3 is an enlarged end elevation of the apparatus, parts being broken away;

Fig. 4 is a longitudinal sectional view taken substantially along the line 4—4 in Fig. 2;

Fig. 5 is an enlarged sectional view, parts shown in elevation of the lower part of the apparatus, the sectional part of the view being taken substantially along a central line passing through the magazine;

Fig. 6 is a fragmentary detail in elevation of the left-hand end of that part of the apparatus disclosed in Fig. 5;

Fig. 9 is a top plan view with parts removed of the assembled valve disclosed in Fig. 7;

Fig. 10 is a plan detail of the stationary part of the valve;

Fig. 11 is a plan detail of the rotary part of the valve;

Figure 1:
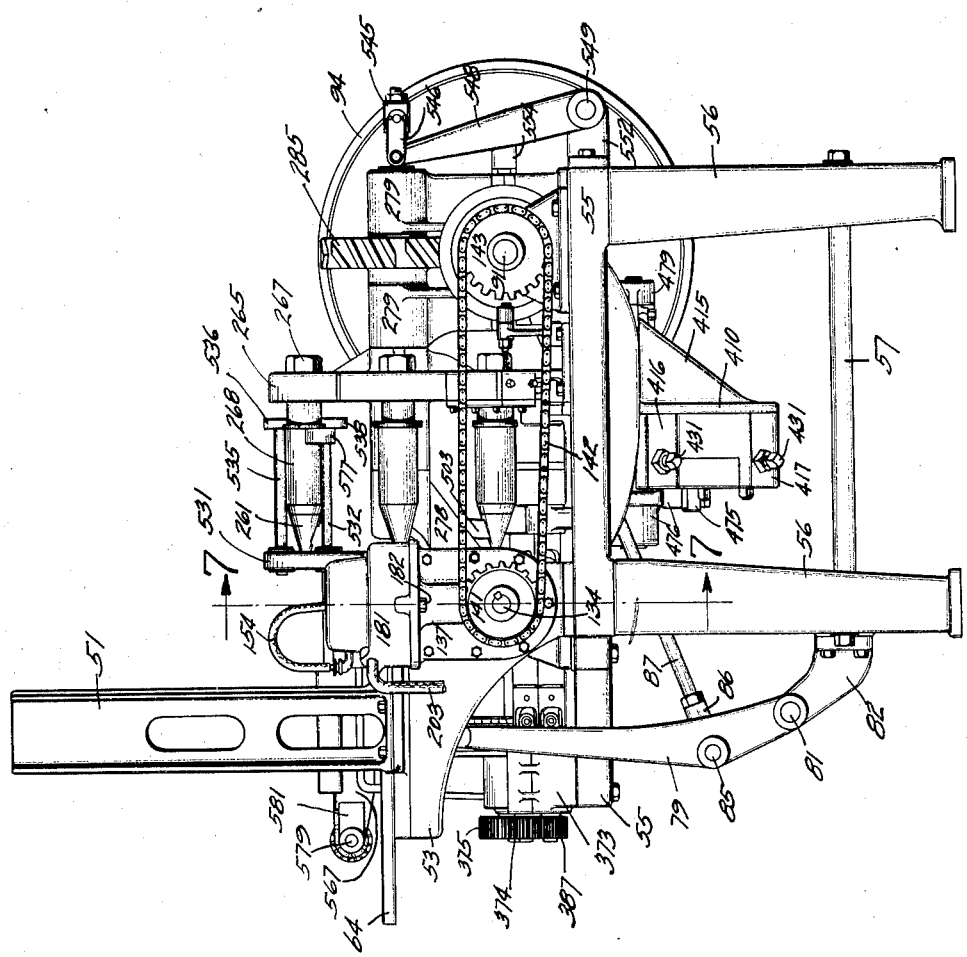
Figure 1 is a front elevation of an apparatus embodying the present invention.

Figs. 12, 13, 14, 15 and 16 are composite sectional details taken through the two principal valve members and showing the parts in different relative positions, the different sections being indicated by lines passing through different positions on the lower member, Fig. 12 being taken substantially along the broken line 12—12 in Fig. 9, Fig. 13 along the broken line 13—13, Figs. 14 and 15 along the broken line 14—14, Fig. 15 showing an advanced position of the movable valve member, and Fig. 16 along the broken line 16—16, all of these section lines being indicated on Fig. 9;

Figs. 17, 18, 19, 20 and 21 are fragmentary transverse sectional views of principal operating parts located at the spreading station illustrating a flattened can body in different stages of its partial reformation;

Figs. 22, 23, 24, 25 and 26 are longitudinal sectional views of the same parts, as are illustrated respectively in the preceding group of views, Fig. 22 being a sectional view of Fig. 17, Fig. 23 of Fig. 18 and so on throughout the other related figures;

Fig. 27 is an enlarged transverse sectional view taken substantially along the broken line 27—27 in Fig. 2;

Fig. 28 is a sectional view taken substantially along the broken line 28—28 in Fig. 27;

Fig. 29 is a sectional view taken substantially along the line 29—29 in Fig. 28;

Fig. 30 is a perspective view of one of the bearing blocks used for supporting an ironing or reforming roller;

Fig. 31 is a fragmentary plan view of the ironing rollers and their driving connections, the point of view being roughly indicated by the broken line 31—31 in Fig. 3;

Fig. 32 is an enlarged fragmentary sectional view, parts being shown in elevation, as viewed substantially along the broken line 32—32 in Fig. 2;

Fig. 33 is a fragmentary plan detail of the link connection disclosed in Fig. 32 as it would appear if viewed along the line 33—33 in that figure;

Fig. 34 is a detailed elevation of a part of the mechanism disclosed in Fig. 32, as viewed substantially along the line 34—34 in that figure;

Fig. 35 is an enlarged plan view of a part of the discharge mechanism.

Fig. 36 is a transverse section taken substantially along the line 36—36 in Fig. 35;

Fig. 37 is a sectional detail taken substantially along the line 37—37 in Fig. 27; and Fig. 38 is an enlarged sectional view taken substantially along the broken line 38—38 in Fig. 2.

The apparatus illustrated in the drawings as disclosing a preferred embodiment of the invention receives the product (flattened can bodies) in stacked formation within a magazine from which a reciprocating feeding device withdraws and feeds an individual body into a spreading station and after a spreading operation performed on the body at this station, further feeds the spread body onto an aligned mandrel which constitutes one of a number of mandrels carried on an intermittently moving turret.

The flattened can body at the spreading station is engaged on the exterior of its flattened walls by opposed suction heads or cups having relative movement toward and away from each other which spread or partially open the can body when separating. A valve mechanism connected with a source of vacuum and with the suction heads, causes the proper holding action of the heads on the walls of the flattened body to permit the opening or spreading operation and breaks the suction to permit release of the partially opened body after this operation. At this station the partially opened can body is also engaged by squeezing members which further open it.

At a reforming station the can body on its mandrel is engaged by a pair of compensated rotating reforming rollers and is ironed out as the mandrel and can body rotate. The formed can body, still on its mandrel, is moved through an idle station and into a discharge position where it is engaged by reciprocating discharge mechanism which strips it from the mandrel and positions it on a continuously moving conveyor chain which carries it out of the machine.

*Flattened can body magazine*

The flattened can bodies, designated by the numeral 50, (Fig. 5) are retained in the machine in stacked formation within a magazine. This magazine is formed by two opposed vertically extending side plates 51 (Fig. 1, 2 and 3) which are formed with interior flanges 52 for retaining the flattened bodies in proper alignment within the magazine. These plates 51 are indirectly supported on a bracket 53 projecting outwardly from a frame 54 (see also Fig. 5 and 7) mounted upon a table or bed 55. The bed 55 is in turn supported by legs 56 tied together by a tie-rod 57.

The stack of can bodies 50, while in the magazine, rests upon blocks 58 (Figs. 3, 5 and 8) located beneath and on opposite sides thereof. The inner upper edge of each block 58 is formed with a groove 59 in which the lowermost can body partially rests. These blocks 58 are secured by bolts 61 to side plates 62, 63 carried by the frame 54. One of the magazine plates 51 is bolted directly to one of the blocks 58 while the other plate 51 is carried on the upper edge of the side plate 63.

A cover guard 64 is bolted at the top and rear to the side plates 62 and 63 (see also Figs. 2 and 3) and this guard partially encloses a portion of the feeding mechanism which separately removes the flattened can bodies from the magazine.

*Flattened can body feed*

The lowermost can body in the magazine is directly in front of notched finger bars 71 (Figs. 3, 5 and 8) secured by bolts 72 to a feed slide 73 having movement within the bracket 53 and the frame 54. The slide 73 is formed with side flanges 74 fitting and having sliding movement within V-grooves 75 formed in the bracket 53 and frame 54.

Feeding of the lowermost can body 50 from the magazine is effected by engagement of the notched bars 71, as the slide 73 is moved forward. For this purpose the slide 73 is pivotally connected at 76 to a link 77 also pivotally connected at 78 to the upper end of a lever 79 (see also Figs. 1 and 6) having rocking movement on a shaft 81 carried in a bracket 82 bolted to one of the legs 56.

The lever 79 is pivotally connected at 85 to a block 86 which is adjustably connected by a connecting rod 87 with an eccentric strap 88 which encircles an eccentric 89 carried on a horizontal drive shaft 91 (see also Figs. 2 and 4) journaled in bearings formed in brackets 92 mounted on the bed 55 and in bearings formed in a gear housing 93 also carried by the bed 55. Power for rotating the drive shaft 91 is applied thereto in any suitable and preferred manner as by means of a belt pulley 94 mounted on the shaft. With the movement of the slide 73 and its finger bars 71 toward the right, as viewed in Fig. 5, the lowermost flattened body 50 is slid along the grooves 59 of the blocks 58 and is brought into position at the first or spreading station.

The slide 73 also carries a pair of finger bars 95, 96 (Fig. 8) secured thereto by bolts 97. The bars 95, 96 extend beyond the forward end of the slide 73 and are utilized for a subsequent feeding operation to be hereinafter fully described. During the feeding of the can body into the spreading station, it rests on the side walls of the slide 73 and on the finger bars 95, 96.

*Spreading station*

The can body in the spreading station (Figs. 5, 7, 8 and 17) rests between stationary blocks 101, 102 bolted to the frame 54. The block 101 is formed with an overhanging ledge 103 and the block 102 is similarly provided with a ledge 104 under which the flattened can body 50 moves in reaching its position at this station. The block 101 is also formed with an inclined inner wall 105 extending downwardly from the overhanging ledge 103 and merging into a projection 106 formed in the block for a purpose hereinafter fully described. The face of the block 102 under its ledge 104 extends vertically for a short distance and then merges into an inclined edge 107.

The flattened can body 50 at this station and under the overhanging ledges 103, 104 of the respective blocks 101, 102, is also directly beneath an upper sucker head 121 carried on the forward end of an arm 122. This arm is adjustably secured, by a hand nut 123 and a screw 124, to the upper end of a sliding bar 125 having vertical movement within a vertical slot 126 cut adjacent the forward end of the side plate 62. This bar 125 is retained in sliding position by a plate 127 bolted to the side plate 62.

The lower end of the sliding bar 125 carries a cam roller 131 which operates within a groove 132 of a face cam 133 mounted on a horizontal shaft 134 journaled in bearings 135 formed in the frame 54 and in a bearing 136 formed in a lower gear casing 137 bolted on one side of the frame 54.

The shaft 134 (Figs. 1 and 7) carries a sprocket 141 over which operates a chain 142 which also passes over a sprocket 143 carried on the shaft 91. By means of this described connection with the drive shaft 91, the sliding bar 125 is raised and lowered, carrying the suction head 121 up and down with it.

The suction head 121 carries a rubber sucker head 151 which is hollow and which communicates with a central channel 152 formed in the head, this channel communicating with a vertical bore 153 extending through the arm 122 and connecting with a flexible tube or pipe 154. This pipe 154 in turn connects with an air and vacuum valve which will be described in detail hereinafter.

The valve provides a connection with a source of vacuum when the sucker rubber 151 is brought down into engagement with the exterior, upper flattened wall of the can body, this position being illustrated in Figs. 17 and 22. In this position the suction head 121 holds the can body up against the projections 103 and 104 of the blocks 101 and 102, and permits return of the slide 73 and withdrawal of the finger bars 95, 96 from beneath the can body.

During such withdrawal of the finger bars a lower suction head 161 is raised into engagement with the lower flattened wall of the body. The head 161 (Figs. 5 and 7) is carried in the upper end of a slide 162 which is mounted for vertical movement within a block 163 bolted to the frame 54 adjacent one of the bearings 135. The slide 162 is retained within its slideways in the block by side plates 164 secured to the face of the block.

This slide 162 (Figs. 5 and 7) is cut out at its center in an opening 165 which allows freedom of movement without interference with the shaft 134 which extends therethrough. The slide 162 is moved up and down by a cam which regulates the operation of the head 161 in proper time with the other operations of the apparatus. For this purpose a pin 166 carried by the slide supports a cam roller 167 which operates within a groove 168 formed in a face cam 169 keyed to the shaft 134.

The suction head 161 carries a hollow sucker cup 171 which is first brought into engagement with the lower flattened surface of the can body 50 as it is held by the upper section head 121 against the ledges 103, 104 of the blocks 101, 102. The interior of the sucker cup 171 connects with a central channel 172 formed in the suction head 161 and this channel leads to the interior of a flexible tube 173 (Fig. 3) connecting with a pipe 174 that leads back to the air valve previously referred to. This valve imparts a proper suction to the suction head 161 which is in synchronism with the raising and lowering of the head by the cam mechanism just described.

*Air and vacuum valve operation*

Figure 7:
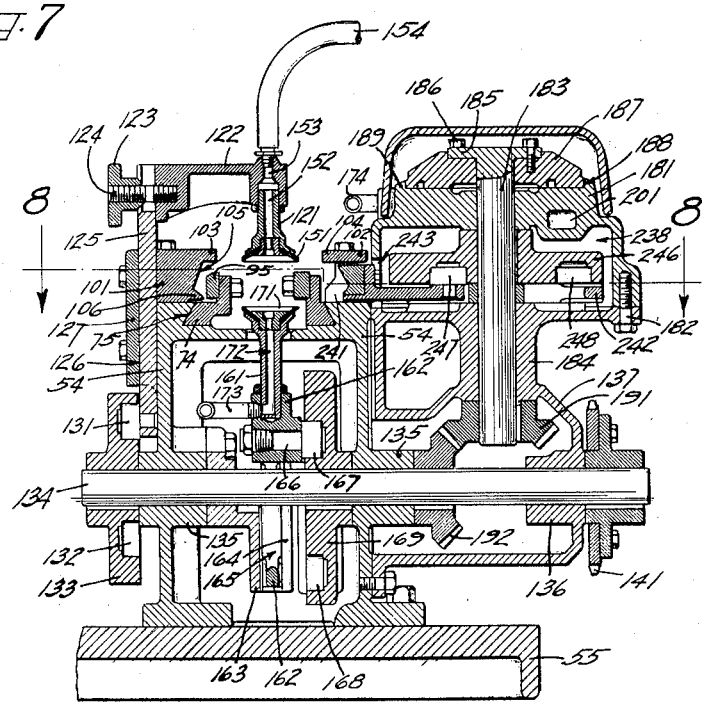
Fig. 7 is an enlarged sectional detail, parts broken away, taken substantially along the line 7—7 in Fig. 1.

The valve, which controls the vacuum in the suction heads 121, 161, is located along the side of the spreading station, see Figs. 1, 3 and 7. This valve comprises a stationary valve member 181 secured by bolts 182 to an upper extension of the lower gear casing 137. The valve member 181 provides an upper bearing for a vertical shaft 183 which is also journaled in a bearing 184 formed in the gear casing 137.

This shaft 183 is enlarged at its upper end to provide a flange 185 which is secured by bolts 186 to a movable valve member 187. The member 187 has a flat smooth bottom which rests upon a similar flat smooth top surface formed in the member 181, the movable member also having a smooth peripheral wall 188 having a sliding fit against an annular wall 189 formed in the member 181. These engaged surfaces between the fixed and the movable valve members form substantially air-tight joints.

Rotation of the valve member 187 connects the suction heads 121, 161 with a source of vacuum at the proper time for spreading the flattened can body and at another time cuts off this vacuum and supplies pressure of the atmosphere to the heads. The valve member 187 is continually rotated during the operation of the machine, the shaft 183 for this purpose carrying a gear 191 which meshes with a corresponding gear 192 keyed to the shaft 134. Both gears 191 and 192 are confined within the lower gear casing 137 as indicated in Fig. 7.

Various positions of the rotatable valve member 187 relative to the stationary member 181 are disclosed in some detail in Figs. 12 to 16 inclusive and reference should now be had thereto as well as to Fig. 9 which discloses in plan both of these valve members. The valve member 181 is provided with an arcuate chamber 201 which extends around the center of the member through less than 180 degrees and this chamber is connected with a radial passageway 202 (Fig. 12) communicating with the interior of a pipe or tube 203 which leads to any suitable source of vacuum such as a vacuum tank or a vacuum pump. By reason of this connection the chamber 201 is exhausted of air and remains in a vacuous condition as long as the apparatus is operating.

At the introduction of the flattened can body 50 into the spreading station, the separated suction heads 121, 161 are not under vacuum but as the valve member 187 rotates first one and then both of the heads are connected with the chamber 201. The flexible tube 154 leading from the upper suction head 121 connects with a nipple 205 screwed into the stationary member 181 (Figs. 3 and 14) and the interior of this tube and nipple communicates with a radial passageway 206 cut in the stationary valve member and this passageway communicates with a vertical passage 207 extending upwardly through the upper surface of the valve member. The movable member 187 is provided with an arcuate groove 208 (Figs. 11 and 14) cut in its under surface and this groove extends around the center of the valve a distance slightly less than 180 degrees.

Vertical passages 211, 212 are cut in the valve member 181 and extend upwardly from the passageway 201, through the upper surface thereof. The valve member 187 moves counterclockwise (Fig. 9) and as the suction head 121 is lowered the groove 208 moves into register with the passage 211. Air is accordingly withdrawn from the groove 208 but suction at the head 121 is delayed until the forward end of the groove 208 moves into register with the passage 207.

The groove 208 still in register with the passage 211 thus connects the suction head with the vacuum and accordingly air is withdrawn from the sucker cup 151 through the passageway 152 in the head 121, through the passageway 153 and through the interior of the pipe 154 and nipple 205, thence through passageway 206, passage 207, groove 208 and passage 211 and is discharged into the vacuum chamber 201. This suction in the upper head 121 is maintained as long as the groove 208 of the valve member 187 is in register with both of the passages 207, 211.

The member 187 also has a second arcuate groove 215 cut in its lower surface and this groove, while being on the opposite side, has the same center as the groove 208 but is closer in toward the center. When the front edge of the groove 215 is moved into register with the passage 212 the groove is exhausted of air. Continued rotation of the valve member 187 then brings the forward edge of the groove 215 into register with a passage 216 (Fig. 15) cut in the valve member 181 which extends downwardly from its upper surface into a lateral passageway 217. With the groove 215 connecting the passages 212 and 216, air is exhausted from the lower sucker cup 171, through the passageway 172 of the head 161, through the tube 173 and pipe 174, the passageway 217, passage 216, groove 215, passage 212 and brought into the chamber 201.

It will be apparent that the relative position of the two grooves 208, 215 and the rotation of the valve member 187 determines the timing of the suction impulses in the heads 121 and 161 and this is in synchronism with the engagement of the heads with the flattened can body and the spreading operation which immediately follows such engagement.

*Spreading operation at spreader station*

Figure 18 discloses the suction heads 121, 161 both in engagement with the flattened can body and at such time suction is established in both heads through the valve as just described. The lower head 161 then moves downwardly under the action of its cam 169, the upper suction head remaining in its initial position. The opposite flat walls of the flattened can body remain in contact with their respective suction heads, with the result that the upper wall is held in position while the lower wall is moved downwardly. This partially opens the can body into the form illustrated in Figs. 19 and 24, this spread body being designated by the numeral 230. The finger bars 95, 96 of the feeding device, which have been moving out of position, are now fully withdrawn from the spreading station.

*Squeezing operation at spreader station*

The operation of spreading just described is accompanied with movement of the corners of the flattened can body from their overhanging ledges 103, 104 to a lower position. This lowering action which was the result of lowering of the lower suction head 161 is accompanied by a lateral movement of certain squeezing devices located at this station and further operating on the can body.

These devices comprise a movable block 231 having an inclined surface 232 which corresponds in angularity with the incline 105 of the block 101. Block 231 is also provided with a projection 233 which is located directly opposite to and which corresponds in shape with the projection 106 of the block 101.

The block 231 is caused to move inwardly to engage the partially spread can body 230 and to force it against the incline 105 of the block 101, the near edge of the body being engaged by the inclined surface 232 of the block 231. This produces a squeezing action on the can body which further opens it into the shape illustrated in Fig. 21 and designated by the numeral 235. With the block 231 in its innermost position as disclosed in this figure, this body 235 rests upon and is supported by the projections 106, 233.

At the beginning of the squeezing operation just described the air and vacuum valve disconnects the suction heads from the source of vacuum and supplies their sucker cups with atmosphere in order to permit free separation of the heads which follows. To do this the valve member 187 (Figs. 9 and 16) reaches a position where its groove 208 is out of alignment with the passage 211 and the groove 215 is out of alignment with the passage 212. The suction heads 121, 161 will still retain hold of the walls of the spread can body 230 even though they are disconnected from the active source of vacuum until the valve member 187 has further moved to a position where its groove 208 passes over a vertical bore 236 and its groove 215 passes over a vertical bore 237 (Figs. 10 and 16).

The bores 236, 237 extend through the upper body of the valve member 181 and open at their lower ends into a chamber 238 located inside of the valve member. This chamber is open to atmosphere. Air accordingly passes through the bore 236, the groove 208, through the passage 207 (Fig. 15) passageway 206, nipple 205, pipe 154 (Fig. 7) and into the suction head 121 breaking the vacuum hold on the can body. At the same time air enters through the bore 237 (Fig. 16) and around the groove 215 through passage 216 (Fig. 15) passageway 217, pipe 174, tube 173 (Fig. 7) and into the lower head 161 likewise breaking its vacuum hold on the flattened can body.

The block 231 of the squeezing device is moved back and forth within a recess 241 (Figs. 7 and 8) formed centrally of the block 102, the block 231 being bolted to the forward end of a sliding yoke 242 extending rearwardly into the chamber 238. The parts 101 and 231 thus constitute means which engage the edges of the can body and hold it while the feeding devices are withdrawn, and the element 231 is movable laterally relative to the can body to cause, and to release, said engagement at proper times. A clearance opening 243 is cut in one side of the vertical wall of the valve member 181 to permit free movement of the yoke, an elongated central opening 244 formed in the yoke giving clearance for the shaft 183 which passes therethrough and a collar 245 mounted on the shaft.

The yoke 242 rests upon the upper edge of the bearing 184 and is directly beneath a cam 246 keyed to the shaft 183. This yoke 242 carries a roller 247 which operates within a cam groove 248 formed in the cam 246. With the can body 235 resting upon the projections 106, 233, it is in position to be inserted over a mandrel for the final reforming operation. A description of the mandrel details will now be given before a description of the operation of the feeding of the can body 235 on to its mandrel.

*Mandrels and supporting turret*

A series of reforming mandrels 261 (Figs. 1, 2, 4 and 27) are provided, the mandrels being spaced from one another and carried by a turret. Each mandrel 261 comprises a stem 262 formed with a conical outer end 263 and a reduced section 264 which passes through the turret herein designated by the numeral 265. A spacer collar 266 is located on the reduced stem 264 and engages a shoulder formed by the rear edge of the stem 262. The outer rear end of the stem 264 is threadedly engaged by a nut 267 which holds the mandrel 261 in position on the turret.

A sleeve 268 is loosely mounted on the stem 262 and freely rotates between the forward edge of the collar 266 and a shoulder 269 extending out from the wall of the stem adjacent the end 263. The stem parts 262, 264 are locked against rotation by a key 271.

The turret 265 is formed with a hub 275 which is mounted upon and keyed to a sleeve 276 journaled in a bearing 277 formed in a bracket 278 mounted on the bed 55 and in bearings 279 formed in a gear housing cover 281 mounted on the gear housing 93.

The turret 265 and its sleeve 276 are adapted for intermittent or step rotation in order to carry the mandrels 261 successively through a series of positions, each mandrel being brought to rest at each position. An interrupted spiral gear 285 and a pinion 286 are used for this step rotation of the turret 265, the gear 285 being keyed to the sleeve 276 intermediate the bearings 279 and meshing with the pinion 286, which is keyed to the shaft 91 within the housings 93, 231. At each rest period a mandrel is presented in alignment with the spreading station and with the spread can body 235 held in the station by the squeezing members 101, 231.

In order that the mandrel be held in exact position to receive the spread can body 235, the turret 265 is engaged at each rest period by a pilot device (Figs. 1, 27 and 38). The outer periphery of the turret 265 is cut across with spaced notches 291, there being a notch between each mandrel. A wedge shaped foot 292 of a sliding pilot bar 293 is adapted to enter into the particular notch presented when the turret comes to rest. The bar 293 is retained within a slideway 294 formed in a box-like housing 295 which is an integral part of a bracket 296 which is bolted to the bed 55, the bar 293 being held within the slideway by a cover plate 297 bolted to the housing.

A longitudinal bore 298 is cut into one end of the bar and a spring 299 extends therein, the end of the spring protruding beyond the end of the bar and engaging an end plate 301 bolted to the housing 295. Under action of the spring 298, the bar 293 when unrestricted is pressed toward the periphery of the turret 265 and when the turret is in its position of rest, is forced into the notch 291. This positively locates the turret, by reason of the wedge shape of the foot 292 fitting within the notch 291 which is also wedge-shaped. This holds the turret in a stationary position.

Provision is made for disengaging the pilot bar 293 from the turret 265 when the latter is making its step rotation and bringing the following adjacent notch 291 into alignment with the pilot bar 293 for the next subsequent locking operation. An arm 302 having a rounded head 303 extends through a clearance opening 304 cut in the housing 295 and into a slot 305 in the sliding bar 293. The head 303 and the arm 302 are moved forward by action of the spring 298 and are moved backward positively by cam action which withdraws the wedge 292 of the bar 293 from its notch 291 while compressing the spring 298.

The arm 302 (Fig. 38) is keyed to a rockshaft 306 which has oscillation within a bearing 307 formed in the base of the bracket 296. An arm 308 is also secured to the rockshaft 306 and carries a pin 309 on which is rotatably mounted a cam roller 311 which operates against a cam track 312 formed in a face cam 313 keyed to the shaft 91. The cam roller 311 is normally held in engagement with the cam track 312 by the spring 298 but if for any reason the bar 293 is prevented from moving forward, as by improper positioning of the turret, the cam track will leave the roller 311 and the bar 293 will remain stationary without doing any damage to the machine.

*Can body feed to mandrel*

Figure 8:
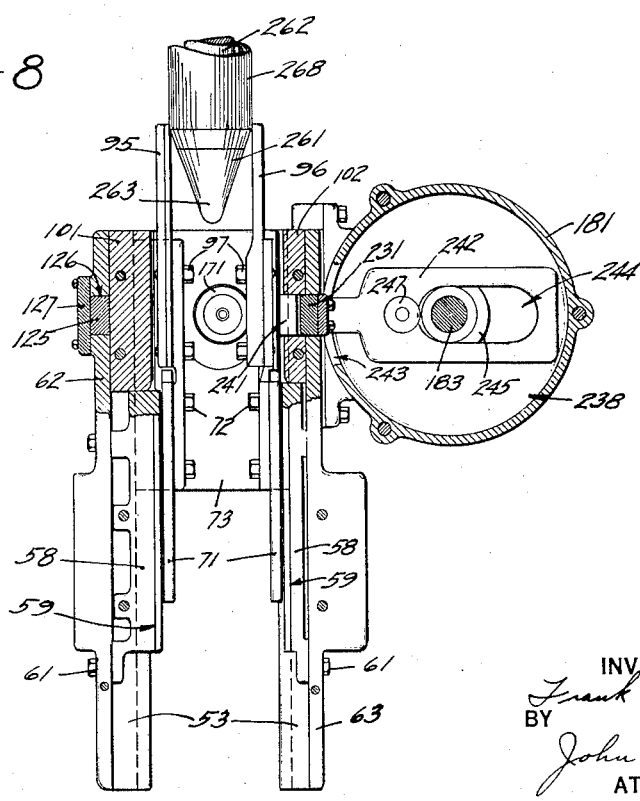
Fig. 8 is a plan sectional view taken substantially along the line 8—8 in Fig. 7.

With the turret 265 at rest and a mandrel in alignment with the spread can body 235, the body is slid from the spreading station on to the mandrel by a reciprocation of the feed slide 73 (Figs. 5 and 8). At the same time the next succeeding flattened can body 50 is transferred from the stack into the spreading station.

To effect this feeding of the spread can body 235 over the mandrel, this body is engaged by the forward ends of the finger bars 95, 96 and slid longitudinally along the projections 106 and 233 of the blocks 101 and 231. This can body is sufficiently open or spread to easily pass over the tapered end 263 of the mandrel 261 and the finger bars 95, 96 move it into position upon the sleeve 268 of the mandrel, the forward edge of the body engaging projecting lugs 315 (Figs. 4 and 27) formed on the spacer collar 266.

This feeding of the can body onto a mandrel takes place at the station A in Fig. 27. From this station the can body is transferred by step rotation with the turret, first, through an idle station B where no operations takes place on the body and thence into a reforming station C where the can body is finally reformed into circular can body shape.

*Reforming station*

In the reforming operation at station C, the body 235 on the mandrel shell 268 is engaged by a pair of reforming rollers 325 and 326 (Figs. 27, 29 and 31). The roller 325 is mounted on a stub shaft 327 which is carried in bearings 328 (see also Fig. 30) formed in a bearing block 329. This block has a pair of spaced lugs 331 which provide for a pivotal connection with a shaft 332 carried in a slide unit which will be hereinafter described. The roller 326 is mounted in a similar manner, being keyed to a stub shaft 335 which is journaled in bearings 336 formed in a bearing block 337. The bearing block 337 has a pair of spaced lugs 338 which provide pivotal connection with the shaft 332 and the slide unit.

The roller shafts 327, 335 and their respective rollers 325, 326 are in this way supported for rotation which action irons out the body wall. They are also moved back and forth to bring the rollers into reforming position and to remove the rollers from interfering positions when a new can body is brought into place. The mounting of the rollers in their respective bearing blocks permits independent pivoting movement of the blocks and this feature provides self-adjusting, self-compensating rollers which more correctly follow the can body surfaces in the reforming operation. These three independent movements will be more clearly understood following the succeeding description.

Provision is made for constantly rotating the roller shafts 327, 335 irrespective of their locations relative to the mandrel, the actuating mechanism for performing this rotation being always in rotating connection with the roller shafts.

The actuating devices, to be hereinafter described, comprise rotating shafts journaled in stationary bearings and the connection between each actuating shaft and each reforming roller shaft is by means of a sliding tongue and slot device interposed between universal joints. Therefore, as the reforming roller shafts are lifted, this being when the reforming rollers engage the body, the tongue and slot connections lengthen without becoming disengaged and the universal joints compensate for any distortion set up in the system.

For this purpose the stub shaft 327 is extended beyond one of its bearings 328 to provide an enlarged head 341 and in a similar manner the shaft 335 is extended beyond its bearing 336 to provide an enlarged head 344.

The sliding slot and tongue connecting devices previously referred to comprises in each case, two shafts 345 and 346 which are loosely interconnected at their ends by a tongue and slot joint 347. This joint permits slight endwise relative movement between the shafts while retaining connection in their rotary movement. Each joint 347 is enclosed within a sleeve 348 which extends over the ends of both shafts 345, 346, this sleeve being ordinarily held on the shaft 345 by a ball detent 349 located in a transverse bore 351 formed in each shaft 345, the ball being backed up by a spring 352 also located within the bore.

During normal driving conditions the detent 349 rests within a depression 353 formed on the inside of the sleeve 348 and this holds the sleeve in its position on the shaft 345. The end of the shaft 346 inside of the sleeve 348 carries a tongue 354 which extends into a slot 355 cut in the sleeve. This tongue and slot joint allows for complete removal of the shafts 345 from the shafts 346 without disturbing the latter, the detent yielding to permit slipping of the shaft 345 from its sleeve 348.

Each shaft 345 is connected, by a universal joint 356, to the head 341 or to the head 344, as the case may be, and in a similar manner each shaft 346 is connected by a universal joint 357 to one of the actuating shafts. The actuating shaft, which connects with the reforming roller shaft 327 through the described universal and slot and tongue joints is designated by the numeral 371 (Figs. 3, 4, 31) and this shaft is journaled in a bearing 372 formed in a bracket 373 mounted on the bed 55. The shaft 371 carries a spur gear 374 which meshes with and is continually driven by a gear 375 mounted on a longitudinal shaft 376 journaled in a bearing 377 formed in the bracket 373 and in a bearing 378 formed in a bracket 379 (see also Fig. 2) mounted on the bed 55.

The other actuating shaft which connects with the reforming roller shaft 335 through its universal and slot and tongue joints is designated by the numeral 385 and this shaft is journaled in a bearing 386 formed in the bracket 373. The shaft 385 carries a gear 387 which meshes with an idler gear 388 rotatably mounted on a stud 389 supported by the bracket 373. The gear 388 also meshes with the gear 374 and both gears 374, 387 are thus uniformly rotated. This insures uniform rotation of the reforming shafts 327, 335 and the reforming rollers 325, 326 and turns them in the same direction so that the rollers will properly cooperate with the reforming mandrel.

The shaft 376 carries a bevel pinion 391 (Figs. 2 and 31) which meshes with a gear 392 keyed to the drive shaft 91. The rotating rollers 325 and 326 engage the outer periphery of the can body positioned on the mandrel sleeve 268 when the slide unit moves them into position.

To insure that the sleeve 268 is rotated on its stem 262 and the can body 235 with it, provision is made for friction engagement between the rollers 325, 326 and the can body. For this purpose roller 325 (Fig. 31) is provided with a pair of spaced grooves 401 cut in its periphery and frictional collars 402 formed of rubber or other resilient material are located in the grooves and extend normally beyond the face of the roller. In a similar manner roller 326 is grooved at 403 for the reception of a frictional collar 404.

With the mandrel containing the can body 235 at rest at the reforming station C the rollers 325, 326 are pressed upwardly against the can body by the slide unit now to be described in detail and their respective collars 402 and 403 yield sufficiently at their points of contact to bring the surface of the rollers into engagement with the exterior wall of the can body. This prevents any slipping between the surface of the rotating rollers and the flattened can body which also rotates in unison with the mandrel sleeve 268. In this way the wall of the can body is ironed out and smoothed and the body fully reformed.

This supporting slide unit for the reforming rollers (Figs. 27, 28 and 29) comprises a bracket housing 410 secured to a supporting pad 411 formed on the under surface of the bed 55, bolts 412 being used to securely fasten the bracket in position. The bed 55 is formed with an opening 413 through which the bearing blocks 329, 337 extend and operate with other connecting parts.

The bracket 410 at its rear is formed with webs 414, 415 to provide the proper strength and on its front side it is provided with posts 416, 417 along one side and posts 418, 419 on the opposite side. Posts 418, 419 are recessed at 421 to provide pockets for a block 422 held in fixed position by bolts 423. The posts 416, 417 are recessed at 425 to provide pockets for a movable block 426 held in clamped position relative to the posts by bolts 427 passing through elongated ports 428 formed in the block 426, these bolts 427 having threaded connection in the bracket 410.

An adjusting bolt 431 passes through each of the posts 416, 417 and has threaded engagement therein, the ends of the bolts protruding through the posts and engaging one side of the block 426. A locknut 432 threadedly mounted on each bolt 431 holds it in adjusted position. The bolts 431 provide limit stops for the block 426 and provide easy adjustment, while the bolts 427 clamp the block after adjustment.

The blocks 422, 426 provide supports for a movable slide member which carries the bearing blocks 329, 337, the block 422 being formed with a slot 441 along its inner face and the block 426 being similarly slotted at 442. This movable slide member comprises a slide body 445 which carries spaced lugs 446 at its upper end, these lugs forming the support for the shaft 332 on which the bearing blocks 329, 337 are pivoted.

The slide body 445 is interiorly recessed by a pair of spaced channels 451 (Fig. 29) extending from the upper end adjacent the lugs 446 to a position below the center where they merge into bores 452 which communicate with a single opening 453 at the bottom of the slide. Each channel 451 is adapted to contain a sliding pressure plunger 454 and each plunger is recessed at 455 to accommodate a spring 456 which bears at its upper end against the end wall of the recess 455 and extends into the bore 452 at the other end. The lower end of each spring 456 engages a collar 457 which has slight movement within the bore 452 to permit adjustment of compression of the spring.

A rod 461 is threadedly secured to the forward end of each pressure plunger 454 and passes through its spring 456 and through its collar 457, the lower end extending through the end wall of the slide body 445. The outer end of each rod 461 is formed with a thread and locknuts 462 are threadedly secured thereto and rest against the end wall of the body 445 this limiting the outermost (raised) position of the pressure plungers 454 under the action of their springs 456.

A compression block 465 is located within the opening 453 and loosely surrounds both of the parallel rods 461, the outer ends of the block resting against the collars 457. The central part of the block is engaged by an adjusting screw 466 threadedly secured in the end wall of the slide body 445 and adjustment of the screw 466 moves the block 465 inwardly or outwardly and varies the compression upon the springs 456 by movement of the collars 457 within their bores 452. By this means the amount of compression imposed upon the two springs 456 is equalized and is thus maintained constant irrespective of the individual adjustment for position effected by the rods 461 and their locknuts 462.

The pressure plungers 454 are utilized as equalizers for the bearing blocks 329, 337, the yielding action of the springs 456 insuring proper engagement of the rollers 325, 326 against the exterior wall of the flattened can body on the mandrel. Each plunger 454 is formed with a conical head 467 which extends into but allows clearance inside the bearing blocks 329 and 337.

Each plunger carries a hardened steel pressure button 468 which engages a similar button 469 carried in the bearing blocks 329, 337. The springs 456 thus force the pressure plungers 454 upwardly and their buttons 468 press against the corresponding buttons 469 in the bearing blocks holding the rollers 325, 326 for the proper reforming operation.

Movement of the slide body 445 is in proper synchronism with the other operating parts of the apparatus and is cam controlled. To effect this sliding movement, the slide body 445 carries a pin 475 (Figs. 27, 28 and 29) extending beyond both faces of the slide body. The ends of the pin 475 are engaged by bifurcated arms 476 keyed to a rockshaft 477 oscillating in bearings 478 and 479 formed in the bracket 410. The bearing 478 is adjacent the front wall of the bracket 410 while the bearing 479 is offset toward the rear, as illustrated in Fig. 28. It will be observed that the bracket 410 is relieved at 481 to permit free movement of one of the arms 476.

The rockshaft 477 also carries an arm 485 which extends upwardly along one side of the bed 55, and the upper end of the arm 485 carries a cam roller pin 487 on which is rotatably mounted a cam roller 488 which operates within a cam groove 489 formed in a barrel cam 491 secured to the drive shaft 91. Oscillation of the cam 491 and, 477 is thus cam controlled from the described connections, the slide body 445 is moved to bring the reforming rollers 325, 326 into reforming position.

The reforming operation requires considerable roller pressure which is brought to bear upon the mandrel by the reforming rollers 325, 326, the springs 456 being relatively stiff. To offset this pressure the outer end of each mandrel, when it is in position at the reforming station C, is supported, a cylindrical boss 501 (Figs. 4, 27 and 37) extending downwardly from the bracket 278, adjacent the bearing 277 and at an angle.

A pocket 502 is formed in the outer end of the boss 501 and an anvil 503 is removably positioned therein. This anvil is provided with a tapered slot 504 and the boss 501 is provided with slots 505 which are in alignment with the slot 504 when the anvil 503 is in its pocket. A wedge 506 passing through the slots 505 and through the anvil slot 504 holds the anvil securely within its pocket, the wedge terminating in a threaded stem 507 which is engaged by a nut 508 resting against a washer 509 located adjacent the outer wall of the boss 501.

The conical end 263 of each mandrel is flattened at 511 to provide a notch and as a mandrel comes to rest at the reforming station C, this notch is brought adjacent to the outer face of the anvil 503 (Fig. 27). When the reforming rollers 325, 326 move into engagement with the flattened can body on the mandrel and pressure is brought to bear against the stem 262, it yields sufficiently to permit full seating of the mandrel end 263 against the anvil 503. In such a position, the mandrel is fully backed up and sufficient pressure can then be applied against the body wall on the mandrel to effect complete reformation thereof. Following the reforming operation, the reforming rollers 325, 326 are retracted from engagement with the reformed can body by return movement of the slide body 445. The turret 265 is then advanced another step in its rotation and the mandrel containing the reformed body, now designated by the numeral 515, is brought to rest at an idle station D (Fig. 27) while a succeeding can body is brought into the reforming station C. At the next step rotation, the reformed can body is moved from the station D to a discharge station E, where it is first stripped from the mandrel by a reciprocating device and thence conveyed out of the machine.

*Discharging station*

A sliding rod 525 (Figs. 3, 4, 27) extends centrally and longitudinally of the turret sleeve 276 and its forward end slides within a boss 526 formed in a bracket 527 bolted on the side plate 62. The rod 525 carries a counterweight 528 positioned on its extreme forward end which balances other parts connected to its rear end. A frame 531 is mounted on the rod 525 and is secured to a second parallel rod 532 which has sliding movement within a bearing 533 formed in the bracket 527. The rod 532 at its forward end also carries a counterweight 534, the counterweights 528, 534 insuring easy sliding movement of the rods 525, 532.

The frame 531 moves back and forth with the parallel rods 525, 532 and with a third rod 535 also parallel to the other two rods and secured in the frame 531. The rod 535 extends rearward from the frame 531 and carries a roller 536. In a similar manner the rod 532 extends rearward and rigidly supports a link 537 which carries a roller 538 at its free end.

When the frame 531 and the rods 525, 532, 535 are in their backward position the rollers 536, 538 are back of the end of the sleeve 268 of the mandrel, these rollers resting between the projections 315, formed on the coller 266, as illustrated in Fig. 27. In this rear position the discharging unit does not engage nor lie in the path of movement of the mandrel unit which is free to move from one station to another.

With the mandrel unit at rest and a reformed can body in position at the station E, the discharge unit comprising the rods 525, 532, 535 is slid forward and the rollers 536, 538 engaging behind the rear edge of the reformed can body 515 slides it from the mandrel sleeve 268. The can body then falls upon a discharging chain conveyor.

Sliding of the rod 525 and through it sliding movement of the frame 531 and the discharge unit is controlled from the drive shaft 91. For this purpose the rear end of the rod 525 is threadedly engaged in a block 545 (Figs. 4, 32, 33) pivotally connected to links 546 pivoted at 547 to the upper end of a lever 548. The lever 548 (see also Fig. 34) is mounted on a shaft 549 oscillating in bearings 551 formed in a bracket 552 bolted to the bed 55. The lever 548 carries a pin 553 to which is pivotally connected a clevis 554 adjustably secured to a connecting rod 555 connected with an eccentric strap 556 which encircles an eccentric 557 carried on the drive shaft 91.

The discharging conveyor into which the reformed can body 515 falls, comprises a pair of chains 565 (Figs. 3, 4, 35 and 36) whose upper runs move within grooves 566 formed in a frame 567 supported at 568 on the bracket 527 and at 569 on the upper end of a bracket 571 bolted to one end of the bed 55.

The chains 565 operate over idler sprockets 575 secured to a shaft 576 rotating freely in bearings 577 formed integrally with the frame 567, and over drive sprockets 578 secured to a shaft 579 journaled in bearings 581 also formed as an integral part of the frame 567. The can bodies 515 rest upon and are carried between the chains 565, as illustrated in Fig. 36, and are conveyed out of the machine by constant movement of the chains 565 over the upper surface of the frame 567.

The shaft 579 carries a bevel gear 585 which meshes with a similar gear 586 secured to a stub shaft 587 journaled in a bearing 588 formed in the frame 567. The shaft 587 also carries a sprocket 591 over which operates a chain 592 which passes over a second sprocket 593 secured to the shaft 376. In this manner the chains 565 provide a constantly moving endless conveyor for the discharge of the reforming can bodies 515.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for reforming flattened can bodies, the combination of spreader means operating on the exterior of a flattened can body for initially opening it, means for squeezing toward each other the edges of the partly opened can body, a mandrel, feeding devices for forcing the spread can body on said mandrel, and means for fully reforming said body while on said mandrel by ironing its walls into can body shape.

2. In a machine for reforming flattened can bodies, the combination of spreader means including suction heads engaging the walls of and operating on the exterior of a flattened can body for initially opening it, a mandrel, feeding devices for forcing the spread can body on said mandrel, and rotary ironing means for fully reforming said body while on said mandrel by ironing its walls into can body shape.

3. In a machine for reforming flattened can bodies, the combination of spreader means including suction heads arranged in line with each other on opposite sides of the station of the can body and operating on the exterior of a flattened can body, and actuating means for moving said heads into engagement with the flat walls of the can body and on opposite sides thereof and for separating said heads to initially spread and partially open said flattened can body, and squeezing means operating on the edges of said can body.

4. In a machine for reforming flattened can bodies, the combination of spreader means including suction heads operating on the exterior of a flattened can body, actuating means for moving said heads into engagement with the flat walls of the can body and on opposite sides thereof and for separating said heads to initially spread and partially open said flattened can body, and ironing means for fully reforming said spread can body into can body shape.

5. In a machine for reforming flattened can bodies, the combination of spreader means including suction heads operating on the exterior of a flattened can body, actuating means for moving said heads into engagement with the flat walls of the can body and on opposite sides thereof and for separating said heads to initially spread and partially open said flattened can body, a mandrel, feeding devices for forcing the spread can body on said mandrel, and ironing means for fully reforming said body while on said mandrel by ironing its walls into can body shape.

6. In a machine for reforming flattened can bodies, the combination of spreader means including suction heads arranged on opposite sides of a flattened can body, actuating means for moving said heads into engagement with the opposite exterior walls of the can body and for separating said heads, and valve means for providing a suction in each head to hold the body wall in engagement with the heads while they are being separated by said actuating means whereby the said can body is initially spread and partially opened, and means for squeezing toward each other the edges of the partly opened body.

7. In a machine for reforming flattened can bodies, the combination of spreader means including suction heads arranged on opposite sides of a flattened can body, actuating means for moving said heads into engagement with the opposite exterior walls of the can body and for separating said heads, valve means for providing a suction in each head to hold the body wall in engagement with the heads while they are being separated by said actuating means whereby the said can body is initially spread and partially opened, and means for ironing and fully reforming said spread can body into can body shape.

8. In a machine for reforming flattened can bodies, the combination of spreader means including suction heads arranged on opposite sides of a flattened can body, actuating means for moving said heads into engagement with the opposite exterior walls of the can body and for separating said heads, valve means for providing a suction in each head to hold the body wall in engagement with the heads while they are being separated by said actuating means whereby the said can body is initially spread and partially opened, a mandrel, feeding devices for forcing the spread can body on said mandrel, and ironing means for fully reforming said body while on said mandrel by ironing its walls into can body shape.

9. In a machine for reforming flattened can bodies, the combination of a magazine for holding the flattened bodies in stack formation, a mandrel located adjacent said magazine, spreader means operating on the exterior of a flattened can body for initially opening it, guiding means having a sliding part by which the can body is squeezed edgewise, feeding devices for removing a can body from said magazine and presenting it to said spreader means and thence removing the partially opened can body from said spreader means and forcing it over said mandrel, and means for fully reforming said body while on said mandrel.

10. In a machine for reforming flattened can bodies, the combination of a magazine for holding the flattened bodies in stack formation, a mandrel located adjacent said magazine, spreader means operating on the exterior of a flattened can body for initially opening it, feeding devices for removing a can body from said magazine and presenting it to said spreader means and thence removing the partially opened can body from said spreader means and forcing it over said mandrel, means for ironing and fully reforming said body while on said mandrel, and devices for discharging the reformed can body from said mandrel.

11. In a machine for reforming flattened can bodies, the combination of spreader means including suction heads and squeezing members, both operating on the exterior of a flattened can body, actuating means for moving said respective suctions heads into engagement with the opposite flat walls of the can body and for separating said heads to initially spread and partially open the body, and means for bringing said squeezing members toward one another with the flattened can body edgewise therebetween to further spread and further open the body.

12. In a machine for reforming flattened can bodies, the combination of spreader means including suction heads and squeezing members, both operating on the exterior of a flattened can body, actuating means for moving said respective suction heads into engagement with the opposite flat walls of the can body and for separating said heads to initially spread and partially open the body, means for bringing said squeezing members toward one another with the flattened can body edgewise therebetween to further spread and further open the body, and means for reforming said spread can body and fully opening it into can body shape.

13. In a machine for reforming flattened can bodies, the combination of a magazine for holding the flattened bodies in stack formation, a spreader station, reciprocating feeding devices for removing a can body from said magazine and advancing it into said spreader station, and means engaging the edges of the can body for holding the can body at said station while said feeding devices are withdrawn therefrom on their return stroke, an element of said engaging means being movable laterally relative to the can body.

14. In a machine for reforming flattened can bodies, the combination of a magazine for holding the flattened bodies in stack formation, a spreader station, reciprocating feeding devices for removing a can body from said magazine and advancing it into said spreader station, means for holding the can body at said station while said feeding devices are withdrawn therefrom on their return stroke, and means located at said station for pulling apart the flattened sides and forcing toward each other the edges of the can body and partially opening said can body.

15. In a machine for reforming flattened can bodies, the combination of a magazine for holding the flattened bodies in stack formation, a spreader station, reciprocating feeding devices for removing a can body from said magazine and advancing it into said spreader station, means for holding the can body at said station while said feeding devices are withdrawn therefrom on their return stroke, means located at said station for partially opening said can body, and ironing means for further opening said can body by reforming it into can body shape.

16. In a machine for reforming flattened can bodies, the combination of a magazine for holding the flattened bodies in stack formation, a mandrel located adjacent said magazine, feeding devices for removing a can body from said magazine and positioning it over said mandrel, a pair of independently yieldable rotating reforming rollers, and means for bringing said rollers into engagement with the exterior of the can body while on said mandrel thereby ironing and reforming the can body into can body shape.

17. In a machine for reforming flattened can bodies, the combination of a magazine for holding the flattened bodies in stack formation, a mandrel located adjacent said magazine, feeding devices for removing a can body from said magazine and positioning it over said mandrel, a pair of rotating reforming rollers, means for bringing said rollers into engagement with the exterior of the can body while on said mandrel and friction means on said rollers and impressible to the ironing surface of the rollers for insuring rotation of the can body and said mandrel therewith to reform the can body into can body shape.

18. In a machine for reforming flattened can bodies, the combination of a set of mandrels rotatably supported from one end and adapted to receive a flattened can body thereover, a turret carrying said mandrels from one station to another, rotating reforming rollers, means for bringing said rollers into engagement with the exterior of the can body while on said mandrel and rotating both body and mandrel through said rollers to reform it into can body shape, and stationary means at the reforming station with which said mandrels successively engage for backing up and supporting the free end of said mandrel during the reforming operation.

19. In a machine for reforming flattened can bodies, the combination of a mandrel adapted to receive a flattened can body thereover, a slide, rotatable reforming rollers pivotally mounted on said slide, means for moving said slide to bring said rollers into engagement with the can body positioned on said mandrel to reform the same, and yielding means effective against each reforming roller and shifting it on its pivotal mounting to center and adjust it relative to the can body on said mandrel.

20. In a machine for reforming flattened can bodies, the combination of a mandrel having one free end and adapted to receive a flattened can body thereover, said mandrel being tapered at its free end so as to engage both sides of said flattened body and spread the same, a slide, rotatable reforming rollers pivotally mounted on said slide, means for moving said slide to bring said rollers into engagement with the can body positioned on said mandrel to reform the same, and extensible shafts for rotating said rollers irrespective of the position of said slide relative to said mandrel and of the pivotal position of said reforming rollers relative to said slide.

21. In a machine for reforming flattened can bodies, the combination of a mandrel adapted to receive a flattened can body thereover, rotatable reforming rollers mounted adjacent said mandrel, means for moving said rollers as a unit, spring devices for yieldingly holding each roller independently in engagement with the can body during its reformation on said mandrel, and means for adjusting said spring devices to vary the amount of pressure applied against the can body by said reforming rollers.

22. In a machine for reforming flattened can bodies, the combination of a mandrel adapted to receive a flattened can body thereover, rotatable reforming rollers mounted adjacent said mandrel, a spring device associated with each reforming roller for yieldingly holding it in engagement with the can body during its reformation on said mandrel, and means for equalizing the amount of yielding pressure applied against the can body by each of said reforming rollers.

23. In a machine for reforming flattened can bodies, the combination of spreader means including oppositely positioned suction heads movable in axial alignment with one another, feeding devices for positioning a flattened can body with its flat walls centrally of and between said suction heads, and actuating means for first moving said heads into engagement with the flat walls of the can body and then for separating said heads to pull the engaged flat sides directly away from each other to initially spread and partially open said flattened can body, and arranged on an axial line between said suction heads a mandrel having a support to which the mandrel is fixedly attached.

24. In a machine for reforming flattened can bodies, the combination of spreader means including oppositely positioned suction heads movable in axial alignment with one another, feeding devices for positioning a flattened can body with its flat walls centrally of and between said suction heads, actuating means for first moving said heads into engagement with the flat walls of the can body and then for separating said heads to pull the engaged flat sides directly away from each other to initially spread and partially open said flattened can body, and opposed axially aligned squeezing members located adjacent the opposite edges of said can body for preventing return of the can body to its flattened condition upon disengagement of said suction heads.

25. In a machine for reforming flattened can bodies, the combination of spreader means including oppositely positioned suction heads movable in axial alignment with one another, feeding devices for positioning a flattened can body with its flat walls centrally of and between said suction heads, actuating means for first moving said heads into engagement with the flat walls of the can body and then for separating said heads to pull the engaged flat sides directly away from each other to initially spread and partially open said flattened can body, opposed axially aligned squeezing members located adjacent the opposite edges of said can body for preventing return of the can body to its flattened condition upon disengagement of said suction heads, and means for bringing said squeezing members toward one another with the flattened can body edgewise therebetween to further spread and further open the body.

26. In a machine for reforming flattened can bodies, the combination of a mandrel adapted to receive a flattened can body thereover, a slide, rotatable reforming rollers at each side of said mandrel pivotally mounted on said slide, means for moving said slide to bring said rollers into engagement with the can body positioned on said mandrel to reform the same, drive shafts rotating on fixed axes for rotating said rollers, and sliding universal connections interposed between said rollers and said shafts for maintaining driving connection irrespective of the position of said slide relative to said mandrel and of the pivotal position of said reforming rollers relative to said slide.

FRANK MARSHALL YOST.